(12) United States Patent
Panciroli

(10) Patent No.: US 8,880,320 B2
(45) Date of Patent: Nov. 4, 2014

(54) METHOD FOR CONTROLLING THE SPEED OF AN INTERNAL COMBUSTION ENGINE SUPERCHARGED BY MEANS OF A TURBOCHARGER

(75) Inventor: Marco Panciroli, Bologna (IT)

(73) Assignee: Magneti Marelli S.p.A., Corbetta (IT)

( * ) Notice: Subject to any disclaimer, the term of this patent is extended or adjusted under 35 U.S.C. 154(b) by 457 days.

(21) Appl. No.: 13/246,539

(22) Filed: Sep. 27, 2011

(65) Prior Publication Data
US 2012/0109490 A1 May 3, 2012

(30) Foreign Application Priority Data

Sep. 27, 2010 (IT) .............................. BO2010A0578

(51) Int. Cl.
| | |
|---|---|
| *F02D 28/00* | (2006.01) |
| *F02B 37/18* | (2006.01) |
| *F02B 37/16* | (2006.01) |
| *F02D 41/00* | (2006.01) |
| *F02D 41/24* | (2006.01) |
| *F02D 23/00* | (2006.01) |
| *F02D 41/18* | (2006.01) |
| *F02B 39/16* | (2006.01) |
| *F02D 41/14* | (2006.01) |
| *F02B 37/12* | (2006.01) |

(52) U.S. Cl.
CPC ....... *F02D 41/0007* (2013.01); *F02B 2039/168* (2013.01); *F02B 37/18* (2013.01); *F02B 37/16* (2013.01); *F02D 41/2432* (2013.01); *Y02T 10/144* (2013.01); *F02D 2041/1432* (2013.01); *F02B 2037/125* (2013.01); *F02D 23/00* (2013.01); *F02B 2037/122* (2013.01); *F02D 41/18* (2013.01)
USPC ...................................... 701/102; 123/559.1

(58) Field of Classification Search
CPC .......... F02B 33/00; F02B 33/44; F02B 37/16; F02B 37/22; F02B 39/10; F02D 23/00; F02D 28/00
USPC ......... 701/102–104, 106, 110, 114; 60/605.1, 60/600–603, 611; 123/559.1–559.3
See application file for complete search history.

(56) References Cited

U.S. PATENT DOCUMENTS 4,196,472 A * 4/1980 Ludwig et al. ................ 701/100
4,967,550 A * 11/1990 Acton et al. .................... 60/794

(Continued)

FOREIGN PATENT DOCUMENTS

| EP | 1741895 A1 | 1/2007 |
| EP | 2014894 A1 | 1/2009 |
| WO | 03071111 A1 | 8/2003 |

OTHER PUBLICATIONS

Mar. 8, 2011 Search Report for Italian Patent App. No. B02010A 000578.

*Primary Examiner* — John Kwon
*Assistant Examiner* — Johnny H Hoang
(74) *Attorney, Agent, or Firm* — Howard & Howard Attorneys PLLC

(57) ABSTRACT

A method controls an internal-combustion engine (1) supercharged by a turbocharger (12) and including a turbine (13) and compressor (14). The control method includes steps of determining a pressure objective downstream of the compressor (14), determining a critical threshold of a reduced-mass-flow rate that delimits on a "reduced-mass-flow rate/compression ratio" plane a critical area substantially close to achievement of sonic conditions, and filtering by a first filter the pressure objective downstream of the compressor (14) when a current reduced-mass-flow rate is higher than the critical threshold.

9 Claims, 6 Drawing Sheets

(56) References Cited

U.S. PATENT DOCUMENTS

Figure 1:
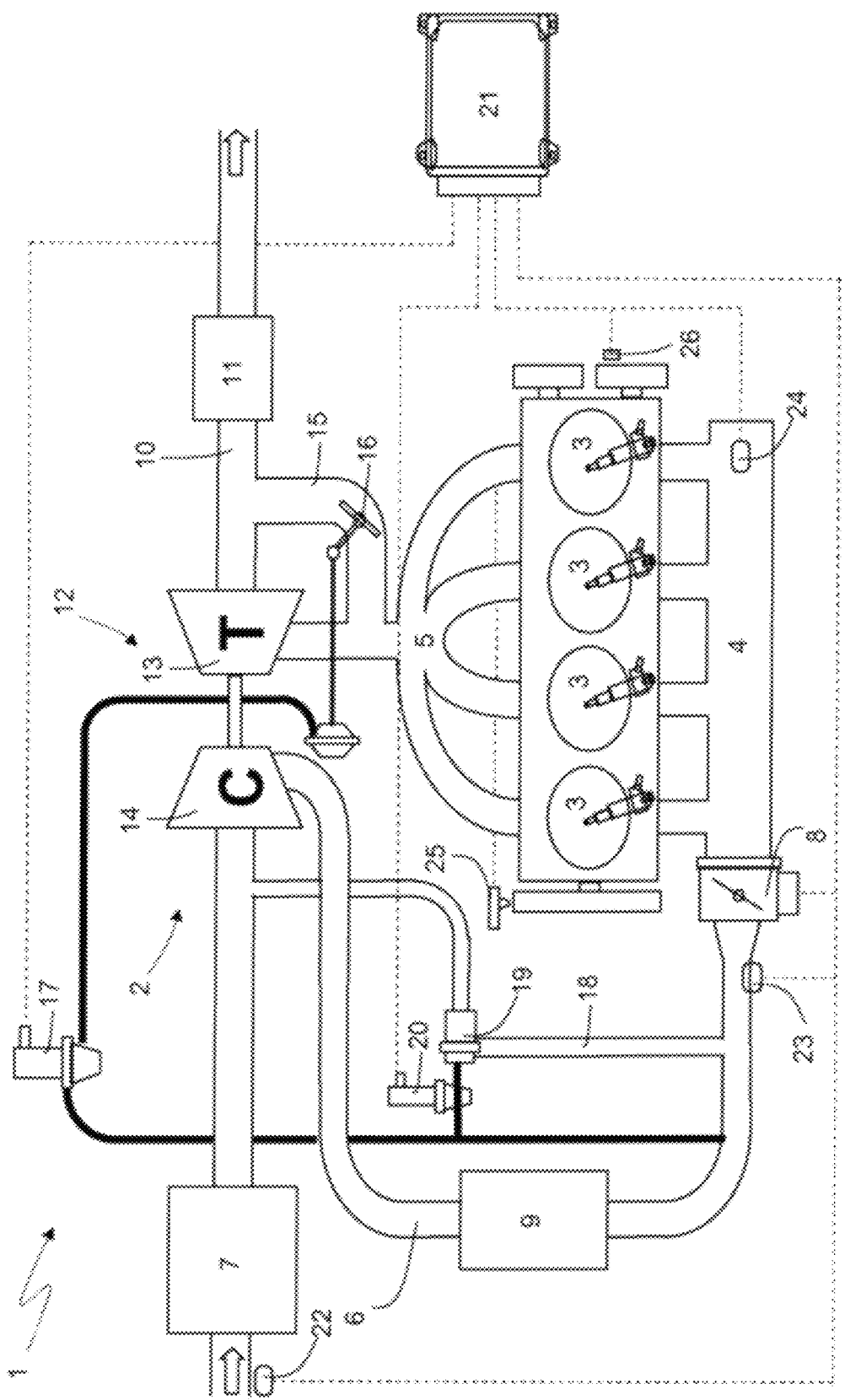

| | | | |
|---|---|---|---|
| 5,005,353 A * | 4/1991 | Acton et al. | 60/39.281 |
| 5,782,092 A * | 7/1998 | Schultalbers et al. | 60/602 |
| 5,829,254 A | 11/1998 | Hayashi et al. | |
| 6,155,050 A | 12/2000 | Blanz et al. | |
| 6,298,718 B1 | 10/2001 | Wang | |
| 8,126,632 B2 * | 2/2012 | Pallett et al. | 701/103 |
| 8,131,446 B2 * | 3/2012 | Pallett et al. | 701/103 |
| 8,406,983 B2 * | 3/2013 | Pallett et al. | 701/103 |
| 2002/0088226 A1 * | 7/2002 | Haupt et al. | 60/602 |
| 2007/0033936 A1 * | 2/2007 | Panciroli | 60/602 |
| 2009/0013688 A1 * | 1/2009 | Panciroli | 60/602 |
| 2009/0293477 A1 | 12/2009 | Shu et al. | |
| 2010/0151294 A1 * | 6/2010 | Rainville et al. | 429/25 |
| 2010/0332180 A1 * | 12/2010 | Seidel et al. | 702/145 |
| 2012/0085158 A1 * | 4/2012 | Murakami et al. | 73/146 |

\* cited by examiner

METHOD FOR CONTROLLING THE SPEED OF AN INTERNAL COMBUSTION ENGINE SUPERCHARGED BY MEANS OF A TURBOCHARGER

REFERENCE TO RELATED APPLICATION

This application claims benefit of the filing date of and priority to Italian Patent Application BO2010A 000578 filed on Sep. 27, 2010.

BACKGROUND OF INVENTION

1. Field of Invention

The invention relates, generally, to a method for controlling an internal-combustion engine and, more particularly, to such an engine that is supercharged by a turbocharger.

2. Description of Related Art

Some internal-combustion engines are provided with a turbocharger-supercharging system, which can increase the power developed by the engine, exploiting the enthalpy of exhaust gases for compressing the air aspirated by the engine and, thus, increasing volumetric-intake efficiency.

A turbocharger-supercharging system includes typically a turbocharger provided with a turbine, which is arranged along an exhaust pipe to rotate at a high speed under the bias of the exhaust gases expelled by the engine, and a compressor, which is rotated by the turbine and arranged along the air-feeding pipe to compress the air aspirated by the engine.

In a turbocharger-supercharging system, the operating range of the turbocharger must be kept within a useful zone depending on crank position both for functional reasons (i.e., to avoid irregular or, in any case, low-efficiency operations) and structural reasons (i.e., to avoid the turbocharger from being damaged).

In particular, the useful zone of the operating field is limited by the "surge" line on the left of a "reduced-mass-flow rate/compression ratio" plane and so-called "saturation" line on the right of the same plane. The "surge" line, thus, delimits a first "forbidden" zone and consists of the location of points in which the internal aerodynamic balance of the compressor is disrupted, and a periodical, noisy violent rejection of flow to the mouth occurs, with effects that may destruct the blades.

Patent Application EP1741895A1 describes a method for controlling an internal-combustion engine supercharged by a turbocharger including a compressor, a turbine adapted to rotationally feed the compressor under the bias of the engine-exhaust gases, and a waste-gate valve adapted to adjust the flow of exhaust gases provided into the turbine for controlling the rotation speed of the turbine itself as a function of an objective supercharging pressure required at the compressor outlet. The control method described in Patent Application EP1741895A1 includes the steps of measuring the air pressure taken in at the compressor inlet; determining the mass-flow rate of the compressor; calculating—by a predetermined map that characterizes the operation of the compressor and, as a function of the predetermined rotation-limit speed, measured air pressure and mass-flow rate—a supercharging-limit pressure, which is correlated to the pressure of the air obtainable at the compressor outlet when the turbine rotates at a speed substantially equal to the predetermined limit speed; verifying whether a required supercharging-objective pressure satisfies a predetermined relation with the calculated supercharging-limit pressure; and, if the relation is satisfied, actuating the waste-gate valve for controlling the rotation speed of the turbine according to the supercharging pressure so as to limit the rotation speed of the turbocharger to a value substantially equal to the predetermined limit speed.

Patent Application EP2014894A1 describes instead a method for controlling an internal-combustion engine supercharged by a turbocharger provided with a turbine and compressor that includes establishing on a "reduced-mass-flow rate/compression ratio" plane at least one "operating limit" curve, at least one "intervention" curve of a waste-gate valve that regulates a bypass pipe of the turbine, and at least one "intervention" curve of a Poff valve that regulates the compressor-bypass pipe. The control method according to Patent Application EP2014894A1 includes using the "operating limit" curve for limiting the objective pressure downstream of the compressor used by the engine-control system. The method further provides for controlling the opening of the waste-gate valve if the "intervention" curve of the waste-gate valve is exceeded and Poff valve if the "intervention" curve of the Poff valve is exceeded. Furthermore, the control method of Patent Application EP2014894A1 is effective in ensuring that the operating field of the turbocharger remains within the useful zone under any operating condition of the internal-combustion engine.

The so-called "saturation" line that delimits a second "forbidden" zone and corresponds to the achievement of sonic conditions (and consequent blockage of the flow) at turbine inlet defines the maximum possible flow that the compressor may supply under given conditions of the aspiration environment. Substantially close to the "saturation" line, the turbocharger, thus, reaches very high speeds and can develop the highest power to compress the air aspirated by the engine, thus increasing the volumetric-suction efficiency. Unfortunately, substantially close to the "saturation" line, due to the high speeds at hand, the turbocharger may accelerate in an uncontrolled manner to reach sonic blockage with destructive effects on the turbocharger itself.

Thus, there is a need in the related art for a method for controlling an internal-combustion engine supercharged by a turbocharger. More specifically, there is a need in the related art for such a method that is easy and cost-effective to implement. There is a need in the related art for such a method that is also capable of ensuring that the operating field of the turbocharger remains within the useful zone under any operating condition of the internal-combustion engine. There is a need in the related art for such a method that is also so capable in all cases without reaching sonic blockage.

SUMMARY OF INVENTION

The invention overcomes the disadvantages in the related art in a method for controlling an internal-combustion engine supercharged by a turbocharger and including a turbine and compressor. The control method includes steps of determining a pressure objective downstream of the compressor, determining a critical threshold of a reduced-mass-flow rate that delimits on a "reduced-mass-flow rate/compression ratio" plane a critical area substantially close to achievement of sonic conditions, and filtering by a first filter the pressure objective downstream of the compressor when a current reduced-mass-flow rate is higher than the critical threshold.

One advantage of the method for controlling an internal-combustion engine supercharged by a turbocharger of the invention is that it is easy and cost-effective to implement.

Another advantage of the method for controlling an internal-combustion engine supercharged by a turbocharger of the invention is that it does not use a high calculating power of an electronic-control unit.

Another advantage of the method for controlling an internal-combustion engine supercharged by a turbocharger of the invention is that it does not require installation of additional electronic components (specifically, sensors or actuators) with respect to those already present in a modern internal-combustion engine.

Another advantage of the method for controlling an internal-combustion engine supercharged by a turbocharger of the invention is that it is particularly effective in ensuring that the operating field of the turbocharger remains within the useful zone substantially close to the "saturation" line under any operating condition of the internal-combustion engine without ever reaching sonic blockage.

Other objects, features, and advantages of the method for controlling an internal-combustion engine supercharged by a turbocharger of the invention are readily appreciated as the control method becomes more understood while the subsequent detailed description of at least one embodiment of the control method is read taken in conjunction with the accompanying drawing thereof.

BRIEF DESCRIPTION OF EACH FIGURE OF DRAWING

Figure 2:
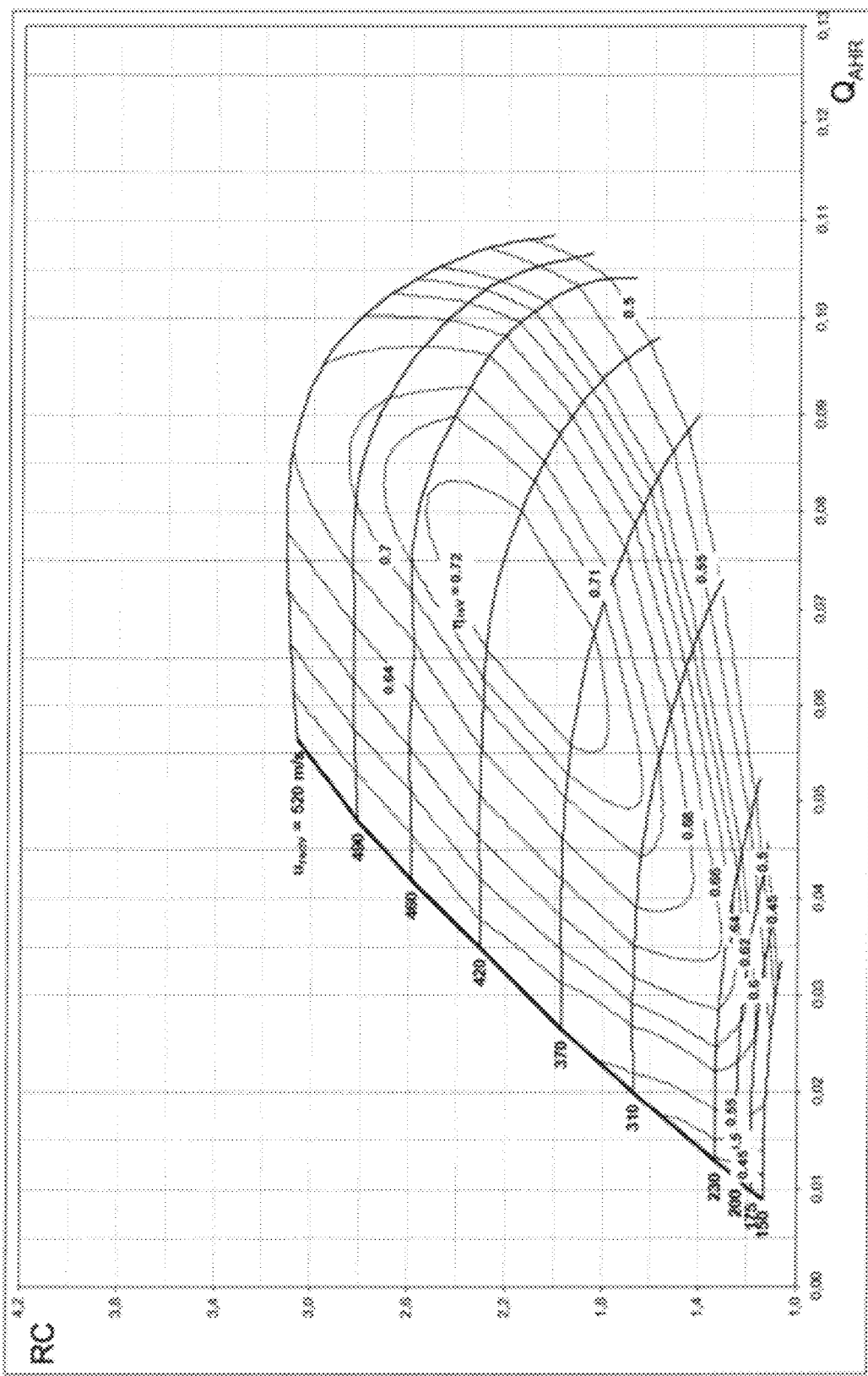

FIG. 1 diagrammatically shows an internal-combustion engine supercharged by a turbocharger and provided with an electronic-control unit that implements a method for controlling the engine according to an embodiment of the invention;

FIG. 2 shows "characteristic" curves of a compressor of the turbocharger diagrammatically shown in FIG. 1 on a "Reduced-Mass-Flow Rate/Compression Ratio" plane; and FIGS. 3-6 show a "Reduced-Mass-Flow Rate/Compression Ratio" plane that illustrates "limit of operation" and "intervening" curves used in the embodiment of the method for controlling an internal-combustion engine supercharged by a turbocharger of the invention implemented by the electronic-control unit diagrammatically shown in FIG. 1.

DETAILED DESCRIPTION OF EMBODIMENT(S) OF INVENTION

In FIG. 1, an internal-combustion engine, generally indicated at 1, is supercharged by a turbocharger-supercharging system 2. The internal-combustion engine 1 includes four cylinders 3, each of which is connected to an intake manifold 4 by at least one respective intake valve (not shown) and to an exhaust manifold 5 by at least one respective exhaust valve (not shown). The suction manifold 4 receives fresh air (i.e., air from the external environment) through a suction pipe 6, which is provided with an air cleaner 7 and adjusted by a butterfly valve 8. An intercooler 9 for cooling the intake air is arranged along the suction pipe 6. An exhaust pipe 10, which feeds the exhaust gases produced by the combustion to an exhaust system, is connected to the exhaust manifold 5, emits the gases produced by the combustion into the atmosphere, and normally includes at least one catalyzer 11 and at least one silencer (not shown) arranged downstream of catalyzer 11.

The supercharging system 2 of the internal-combustion engine 1 includes a turbocharger 12 provided with a turbine 13, which is arranged along the exhaust pipe 10 in order to rotate at high speed under the bias of the exhaust gases expelled from cylinders 3. The supercharging system 2 includes also a turbocharger 14, which is arranged along the suction pipe 6 and is mechanically connected to turbine 13 in order to be rotationally fed by the turbine 13 itself so as to increase the pressure of the air fed into the suction pipe 6.

Along the exhaust pipe 10, a bypass pipe 15 is arranged, which is connected in parallel to the turbine 13 so as to display the ends thereof connected upstream and downstream of the turbine 13 itself. Along the bypass pipe 15 a waste-gate valve 16 is arranged, which is adapted to adjust the exhaust gas flow flowing through the bypass pipe 15 and driven by an actuator 17. Along the exhaust pipe 6, a bypass pipe 18 is arranged, which is connected in parallel to the compressor 14 so as to have the ends thereof connected upstream and downstream of the compressor 14 itself. Along the bypass pipe 18, a Poff valve 19 is arranged, which is adapted to adjust the exhaust gas flow flowing through the bypass pipe 18 and driven by an actuator 20.

The internal-combustion engine 1 is controlled by an electronic-control unit 21, which governs the operation of all the components of the internal-combustion engine 1, including the supercharging system 2. Specifically, the electronic-control unit 21 drives the actuators 17, 20 of the waste-gate valve 16 and of the Poff valve 19. The electronic-control unit 21 is connected to sensors 22 that measure the temperature $T_o$ and the pressure $P_o$ along the intake pipe 6 upstream of compressor 14, to sensors 23 that measure the temperature and pressure along the intake pipe 6 upstream of the butterfly valve 8, and to sensors 24 that measure the temperature and pressure inside the intake manifold 4. Furthermore, the electronic-control unit 21 is connected to a sensor 25, which measures the angular position (and, thus, the rotation speed) of a crankshaft of the internal-combustion engine 1, and to a sensor 26 that measures the timing of the intake and/or exhaust valves. It is similarly worth noting that no sensors adapted to measure the rotation speed of the turbocharger 12 are provided.

Inter alia, the electronic-control unit 21 keeps the operating field of the turbocharger 12 within a useful zone. A description follows of the control method used by the electronic-control unit 21 for keeping the operating field of the turbocharger 12 within a useful zone and for avoiding that the turbocharger 12 achieves sonic conditions substantially close to a "saturation" line 35 (shown in FIGS. 4 and 5).

During a step of designing and tuning the internal-combustion engine 1, the characteristic curves of compressor 14 (supplied by the manufacturer of the turbocharger 12) are analyzed on a "Reduced-Mass-Flow Rate/Compression Ratio" plane. An example of the characteristic curves of a commercial compressor 14 is shown in FIG. 2.

The characteristic curves illustrated in FIG. 2 are normalized at an absolute reference temperature $T_{o\_rif}$ and an absolute reference pressure $P_{o\_rif}$. On the left part of the "Reduced-Mass-Flow Rate/Compression Ratio" plane there is a first "forbidden" zone delimited by the "surge" line consisting of the location of points in which the internal aerodynamic balance of the compressor 14 is disrupted and a periodical, noisy violent rejection of flow to the mouth occurs, with effects that may destruct the blades.

On the right part of the "Reduced-Mass-Flow Rate/Compression Ratio" plane instead there is a second forbidden zone delimited by the so-called "saturation" line 35 (indicated in FIGS. 4 and 5), which corresponds to the achievement of sonic conditions (and consequent blockage of the flow) at the turbine inlet 13 and defines the maximum flow possible that the compressor 14 may provide under given conditions of the suction environment.

Figure 3:
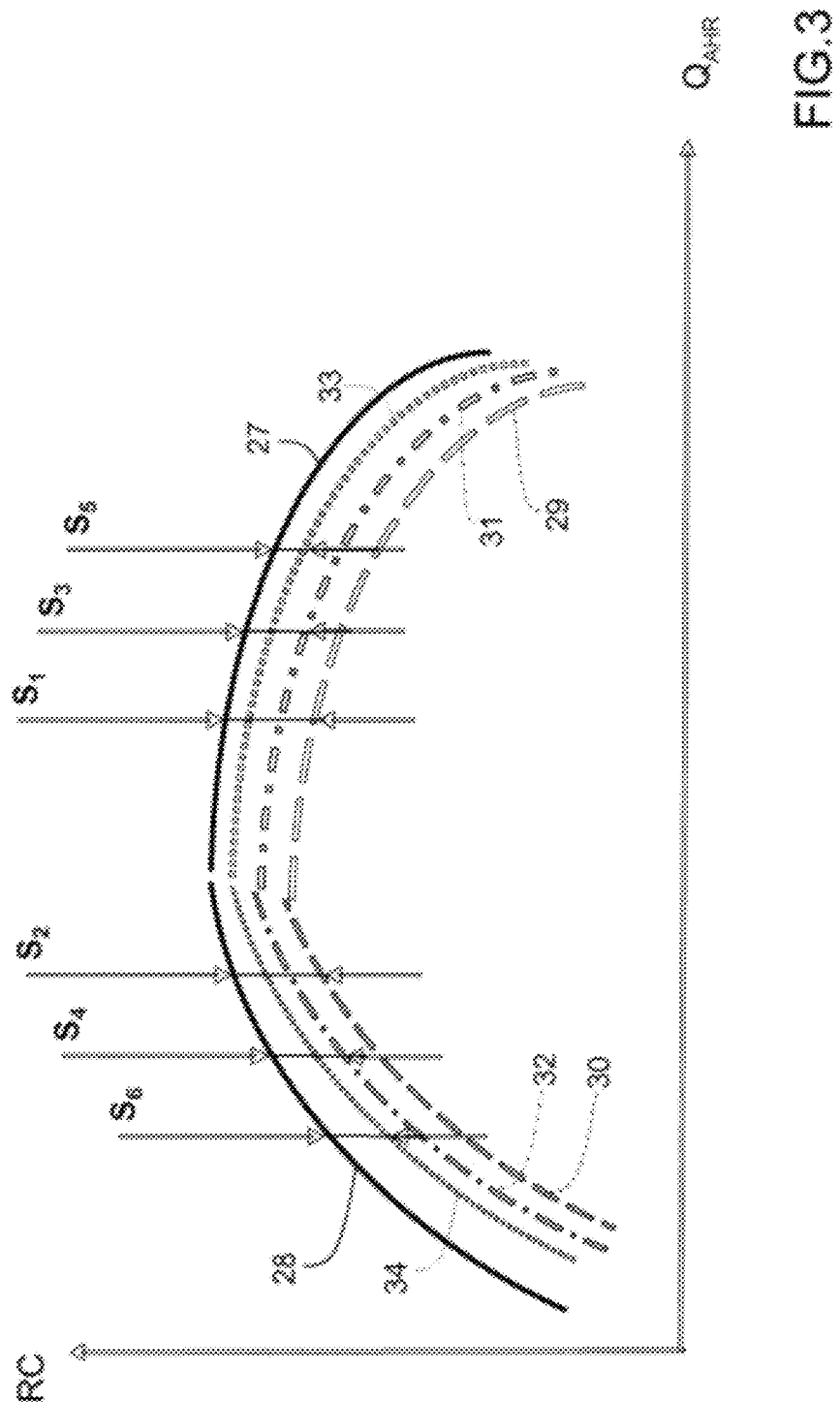
Figure 4:
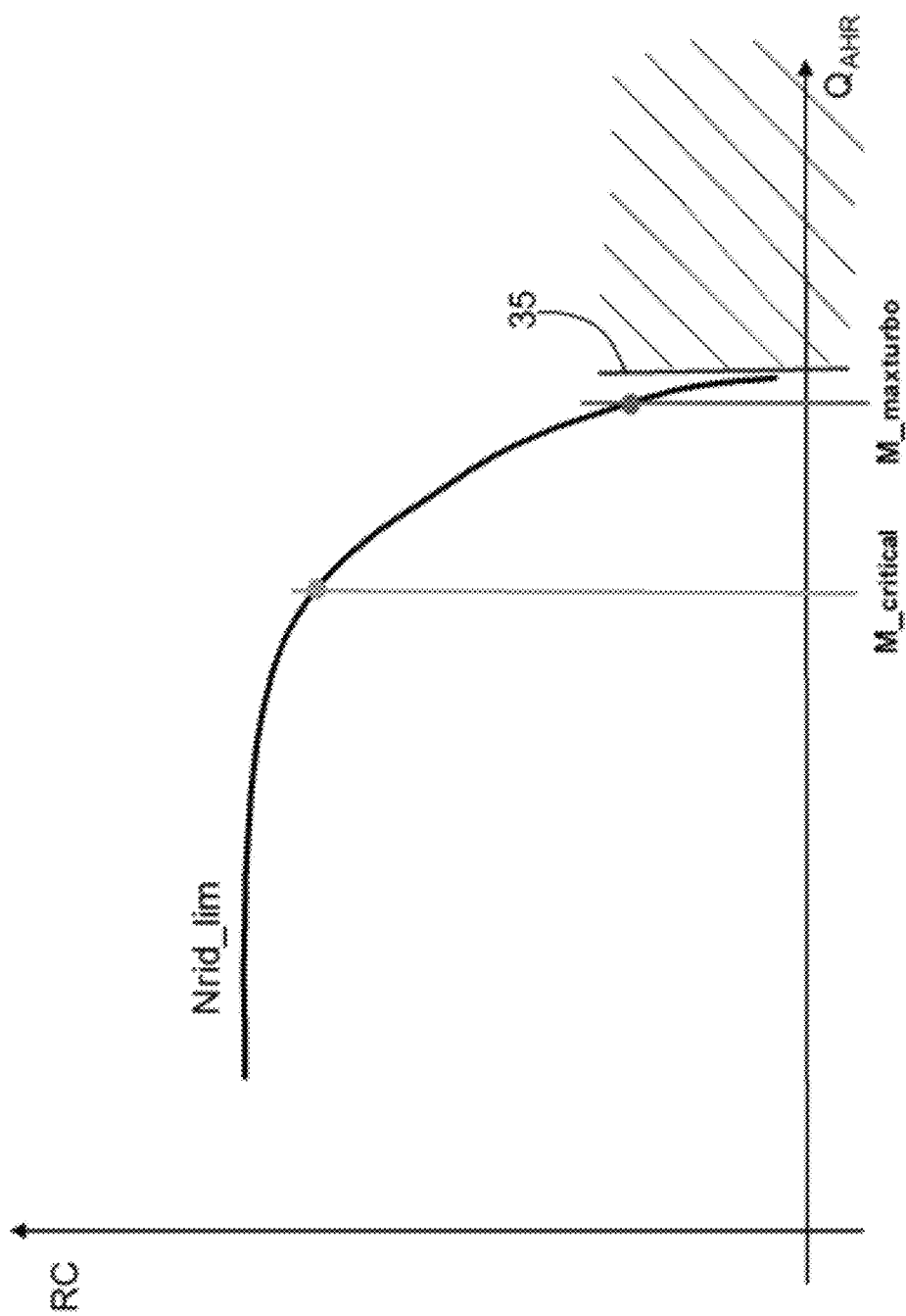

As shown in FIG. 3, a curve 27 that limits the rotation speed of the turbocharger 12 and a curve 28 that delimits the surge of the turbocharger 12 are determined by analyzing the characteristic curves of the compressor 14. Two "operating limit" curves 29, 30 are established as a function of the curves 27, 28 and used for limiting the objective pressure upstream of the compressor 14 used by the engine control. In order to determine the "operating limit" curve 29, a (constant or variable) threshold $S_1$ is determined that establishes the distance between the "operating limit" curve 29 and the curve 27 that limits the rotation speed of the turbocharger 12; similarly, in order to determine the "operating limit" curve 30, a (constant or variable) threshold $S_2$ that establishes the distance between the "operating limit" curve 30 and the curve 28 that delimits the surge of the turbocharger 12 are determined.

Furthermore, as a function of the curves 27, 28, two "intervention" curves 31, 32 of the waste-gate valve 16 that adjusts the bypass pipe 15 of the turbine 13 and two "intervention" curves 33, 34 of the Poff valve 19 that adjusts the bypass pipe 18 of the compressor 14 are established. In order to establish the "intervention" curve 31 of the waste-gate valve 16, a (constant or variable) threshold $S_3$ is determined that establishes the distance between the "operating limit" curve 29 and the "intervention" curve 31 of the waste-gate valve 16; similarly, in order to determine the "intervention" curve 32 of the waste-gate valve 16, a (constant or variable) threshold $S_4$ is determined that establishes the distance between the "intervention" curve 32 of the waste-gate valve 16 and the curve 28 that delimits the surge of the turbocharger 12. In order to determine the "intervention" curve 33 of the Poff valve 19, a (constant or variable) threshold $S_5$ is determined that establishes the distance between the "operating limit" curve 29 and the "intervention" curve 33 of the Poff valve 19; similarly, in order to determine the "intervention" curve 34 of the Poff valve 19, a (constant or variable) threshold $S_6$ is determined that establishes the distance between the "intervention" curve 34 of the Poff valve 19 and the curve 28 that delimits the surge of the turbocharger 12.

During the operation of the internal-combustion engine 1, the electronic-control unit 21 uses the "operating limit" curves 19, 30 to limit the pressure objective downstream of the compressor 14 used by the engine control. In other words, the engine control implemented in the electronic-control unit 21 determines, in a known manner and as a function of the crank position, a pressure objective downstream of the compressor 14 that represents a required, optimal value of the pressure downstream of the compressor 14. If the pressure objective downstream of the compressor 14 is compatible with the "operating limit" curves 29, 30, then the pressure objective downstream of the compressor 14 is kept, otherwise, if the pressure objective downstream of the compressor 14 is not compatible with the "operating limit" curves 29, 30, then the pressure objective downstream of the compressor 14 is limited to the maximum value compatible with the "operating limit" curves 29, 30.

In particular, the current reduced-mass-flow rate $Q_{AH}$ of the compressor 14 is determined in order to limit the pressure objective downstream of the compressor 14; as a function of the current reduced-mass-flow rate $Q_{AH}$ of the compressor 14 the maximum possible compression ratio RC is determined using the "operating limit" curves 29, 30, the maximum possible pressure downstream of the compressor 14 is determined by multiplying the absolute pressure $P_o$ upstream of the compressor 14 by the maximum possible compression ratio RC, and the pressure objective downstream of the compressor 14 is limited to the maximum possible pressure downstream of the compressor 14 if the pressure objective downstream of the compressor 14 is higher than the maximum possible pressure downstream of the compressor 14.

The reduced-mass-flow rate $Q_{AHR}$ of the compressor 14 is determined by using the following equation:

$$Q_{AHR} = Q_{AH} \cdot \sqrt{\frac{T_o}{T_{orif}}} \cdot \frac{P_{orif}}{P_o}$$

wherein
$Q_{AH}$=mass-flow rate of the compressor 14;
$Q_{AHR}$=reduced-mass-flow rate of the compressor 14;
$T_o$=absolute temperature upstream of the compressor 14;
$P_o$=absolute pressure upstream of the compressor 14;
$T_{o\_rif}$=absolute reference temperature; and
$P_{o\_rif}$=absolute reference pressure.

The absolute reference temperature $T_{orif}$ and the absolute reference pressure $P_{orif}$ are the conditions in which the characteristic curves of the compressor 14 and, thus, the curves 27-34 were obtained and are design data known beforehand. The absolute temperature $T_o$ upstream of the compressor 14 and the absolute pressure $P_o$ upstream of the compressor 14 are measured by the sensors 22. The mass-flow rate $Q_{AH}$ of the compressor 14 may be either measured by a specific flow rate sensor or be estimated in a known manner by the electronic-control unit 21.

According to a different embodiment (not shown) the measurement of the absolute temperature $T_o$ upstream of the compressor 14 (i.e., essentially the ambient temperature) may not be contemplated; in this case, the reduced-mass-flow rate $Q_{AHR}$ may be "partially" normalized on the basis of the $P_o/P_{orif}$ pressure ratio without accounting for the ratio between the temperatures $T_o$ and $T_{orif}$.

It is worth noting that the curves 28, 30, 32, 34 are independent from the reduced limit speed $N_{tcR}$ of the turbocharger 12, while the curves 27, 29, 31, 33 are dependent on the reduced limit speed $N_{tcR}$ of the turbocharger 12 (i.e., vary as a function of the reduced limit speed $N_{tcR}$ of the turbocharger 12). In other words, for the turbocharger 12, a predetermined limit speed $N_{tc}$ of the turbocharger 12 is determined, over which the turbocharger 12 is taken to a critical condition; by using the predetermined speed limit $N_{tc}$ of the turbocharger 12 the current reduced limit speed $N_{tcR}$ of the turbocharger 12 is calculated as a function of the absolute temperature $T_o$ upstream of the compressor 14 by using the following equation:

$$N_{tcR} = N_{tc} \cdot \sqrt{\frac{T_{orif}}{T_o}}$$

wherein
$N_{tc}$=limit speed of the turbocharger 12;
$N_{tcR}$=reduced limit speed of the turbocharger 12;
$T_o$=absolute temperature upstream of the compressor 14; and
$T_{orif}$=absolute reference temperature.

The current reduced limit speed $N_{tcR}$ of the turbocharger 12 varies as the absolute temperature $T_o$ upstream of the compressor 14 varies, the predetermined limit speed $N_{tc}$ of the turbocharger 12 being substantially equal; the electronic-control unit 21, thus, cyclically determines the current reduced limit speed $N_{tcR}$ of the turbocharger 12 as a function of the absolute temperature $T_o$ upstream of the compressor 14 and as a function of the predetermined limit speed $N_{tc}$ of the turbocharger 12 (which always remains constant) and can determine the curves 27, 29, 31, 33 to be used as a function of the current reduced limit speed $N_{tcR}$ of the turbocharger 12. Alternatively, in order to simplify the management of the curves 27, 29, 31, 33, being the predetermined speed limit $N_{tc}$ of the turbocharger 12 constant, the curves 27, 29, 31, 33 themselves could be stored in the electronic-control unit 21 and parameterized as a function of the absolute temperature $T_o$ upstream of the compressor 14; thereby, the electronic control does not need to calculate the current reduced limit speed $N_{tcR}$ of the turbocharger 12 nor select the curves 27, 29, 31, 33 to be used, but simply needs to update the curves 27, 29, 31, 33 as a function of the absolute temperature $T_o$ upstream of the compressor 14.

According to a different simplified (and, thus, less accurate) embodiment, the current (not reduced) mass-flow rate $Q_{AH}$ or the objective (reduced or not reduced) mass-flow rate $Q_{AHR}$ could be used instead of using the current reduced-mass-flow rate $Q_{AHR}$.

Once the current reduced limit speed $N_{tcR}$ is determined, the electronic-control unit 21 is set up to determine a critical threshold $M_{critica}$ of the reduced-mass-flow rate $Q_{AHR}$. As better shown in FIG. 4, the critical threshold $M_{critica}$ delimits, on the "reduced-mass-flow rate/compression ratio" plane, a portion of the useful zone of the operating field of the turbocharger 12, which is indicated hereinafter as "critical zone," while, despite remaining within the useful zone, represents the zone substantially close to the achievement of sonic conditions (i.e., substantially close to the "saturation" line 35). The critical zone is characterized by the collapse of efficiency of the compressor 14 and by a high instability of the turbocharger speed 12 that may accelerate dangerously.

Figure 5:
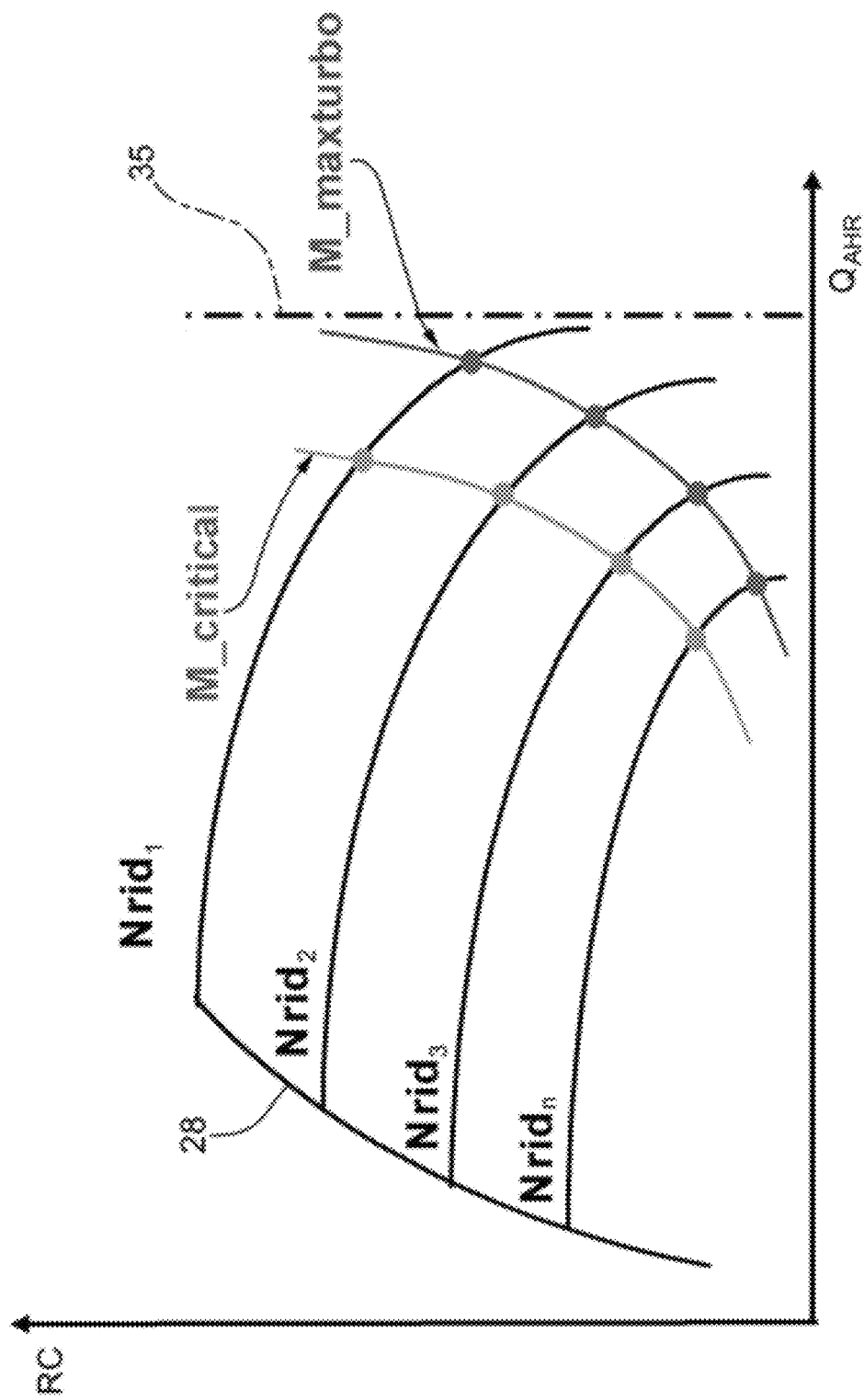

The critical threshold $M_{critica}$ is variable as a function of the reduced limit speed $N_{tcR}$ (as shown in greater detail in FIG. 5).

In order to reduce the instability that characterizes the critical zone, the electronic-control unit 21 is set up to filter the current mass flow $Q_{AHR}$ used to limit the pressure objective downstream of the compressor 14. Similarly, the electronic-control unit 21 is set up to filter the pressure objective downstream of the compressor 14. The filtering of the current reduced mass flow $Q_{AHR}$ used to limit the pressure objective downstream of the compressor 14 and of the pressure objective downstream of the compressor 14 is adapted to reduce the dynamics of the aforesaid magnitudes. According to an embodiment, the filtering is made by a low-pass first order filter.

In case of reduced-mass-flow rate $Q_{AHR}$ higher than the critical threshold $M_{critica}$, the control unit 21 is, thus, set to filter with a first order low-pass filter both the current reduced mass flow $Q_{AHR}$ and the pressure objective downstream of the compressor 14.

According to an embodiment, the control unit is configured to determine a safety threshold $M_{max\_turbo}$ of the reduced-mass-flow rate $Q_{AHR}$. As shown in greater detail in FIG. 4, the safety threshold $M_{max\_turbo}$ delimits a portion to be avoided of the critical zone because it is substantially closest to the achievement of sonic conditions (i.e., substantially closest to the "saturation" line 35) and represents a value of the reduced-mass-flow rate $Q_{AHR}$ beyond which the turbocharger 12 must never go.

The safety threshold $M_{max\_turbo}$ is higher than the critical threshold $M_{critica}$. Furthermore, the safety threshold $M_{max\_turbo}$ is variable as a function of the reduced limit speed $N_{tcR}$ (as shown in greater detail in FIG. 5).

The electronic-control unit 21 is configured to set that the reduced-mass-flow rate $Q_{AHR}$ of the compressor 14 is lower than the safety threshold $M_{max\_turbo}$ of the reduced mass flow $Q_{AHR}$.

According to a further variant, the electronic-control unit 21 is set up to determine a safety threshold $N_{max\_turbo}$ of the speed of the supercharged internal-combustion engine 1. The safety threshold $N_{max\_turbo}$ of the speed of the supercharged internal-combustion engine 1 is determined, in turn, as a function of the safety threshold $M_{max\_turbo}$ of the reduced-mass-flow rate $Q_{AHR}$.

In particular, the safety threshold $N_{max\_turbo}$ of the supercharged internal-combustion engine 1 is calculated by the following equation:

$$N_{max\_turbo} = M_{max\_turbo} \cdot \sqrt{\frac{T_{o\_rif}}{T_o}} \cdot \frac{P_o}{P_{o\_rif}} \cdot \frac{1}{(m \cdot 30 \cdot N_{cil})}$$

wherein $N_{max\_turbo}$=safety threshold of the speed of the supercharged internal-combustion engine 1;

$M_{max\_turbo}$=safety threshold of the reduced-mass-flow rate $Q_{AHR}$;

$T_o$=absolute temperature upstream of the compressor 14;

$P_o$=absolute pressure upstream of the compressor 14;

$T_{o\_rif}$=absolute reference temperature;

$P_{o\_rif}$=absolute reference pressure;

$N_{cil}$=number of cylinders 3 of the internal-combustion engine 1; and m=air mass taken in by each cylinder 3 of the internal-combustion engine 1.

The safety threshold $N_{max\_turbo}$ is used for limiting the supercharged internal-combustion engine 1 so that the current reduced-mass-flow rate $Q_{AHR}$ is lower than the threshold $M_{max\_turbo}$.

According to an embodiment, a predetermined limit speed $N_{tc}$ of the turbocharger 12 is determined for the turbocharger 12 beyond which the turbocharger 12 is taken to a critical condition; the current reduced limit speed $N_{tcR}$ of the turbocharger 12 is calculated by using the predetermined speed limit $N_{tc}$ of the turbocharger 12 as a function of the absolute temperature $T_o$ upstream of the compressor 14 by using the following equation:

$$N_{tcR} = N_{tc} \cdot \sqrt{\frac{T_{orif}}{T_o}}$$

wherein $N_{tc}$=limit speed of the turbocharger 12;

$N_{tcR}$=reduced limit speed of the turbocharger 12;

$T_o$=absolute temperature upstream of the compressor 14; and $T_{orif}$=absolute reference temperature.

The current reduced limit speed $N_{tcR}$ of the turbocharger 12 varies as the absolute temperature $T_o$ upstream of the compressor 14 varies and the predetermined limit speed $N_{tc}$ of the turbocharger 12 being substantially equal; the electronic-control unit 21, thus, cylindrically determines the current reduced limit speed $N_{tcR}$ of the turbocharger 12 as a function of the absolute temperature $T_o$ upstream of compressor 14 and as a function of the predetermined limit speed $N_{tc}$ of turbocharger 12 (which always remains constant) and can determine the curves 27, 29, 31, 33 to be used as a function of the current reduced limit speed $N_{tcR}$ of turbocharger 12. Alternatively, in order to simplify the management of the curves 27, 29, 31, 33, being the predetermined speed limit $N_{tc}$ of the turbocharger 12 constant, the curves 27, 29, 31, 33 themselves could be stored in the electronic-control unit 21 parameterized as a function of the absolute temperature $T_o$ upstream of the compressor 14; thereby, the electronic control does not need to calculate the current reduced limit speed $N_{tcR}$ of the turbocharger 12 nor select the curves 27, 29, 31, 33 to be used, but simply needs to update the curves 27, 29, 31, 33 as a function of the absolute temperature $T_o$ upstream of the compressor 14.

According to that described hereto and shown in FIG. 5, the current reduced limit speed $N_{tcR}$ is variable as a function of a plurality of factors, in particular, of the absolute temperature $T_o$ upstream of the compressor 14.

According to an embodiment, in a preliminary step of setting and tuning, a lower limit speed of the turbocharger 12 and an upper predetermined limit speed of the turbocharger 12 are established (which represents a limit of the turbocharger 12 beyond which it is advisable not to go for avoiding breakage or serious damage to the turbocharger 12 itself). In use, these two values are used to calculate a reduced lower speed $N_{rid\_inf}$ of the turbocharger 12 (which is calculated by the formula illustrated above, and is variable as a function of the predetermined limit speed of the turbocharger 12 and of the absolute temperature $T_o$ upstream of the compressor 14) and reduced upper limit speed $N_{rid\_sup}$ of the turbocharger 12 (which is also calculated by the formula illustrated above, is higher than the reduced limit speed of the turbocharger 12 and is variable as a function of the predetermined limit speed of the turbocharger 12 and of the absolute temperature $T_o$ upstream of the compressor 14). The lower reduced limit speed $N_{rid\_inf}$ of the turbocharger 12 and the reduced upper limit speed $N_{rid\_sup}$ of the turbocharger 12 delimit an overspeed zone on the "reduced-mass-flow rate/compression ratio" plane. During the useful life of the turbocharger 12 frequently occurs that the overspeed zone is displaced on the "reduced-mass-flow rate/compression ratio" plane (e.g., due to the influence of the absolute temperature $T_o$ upstream of the compressor 14). In use, once the current reduced speed is calculated, the electronic-control unit 21 is set up to control the turbocharger 12 to return the reduced limit speed to a value lower than the lower reduced limit speed $N_{rid\_inf}$ whenever a current reduced limit speed value within the overspeed range is detected.

Figure 6:
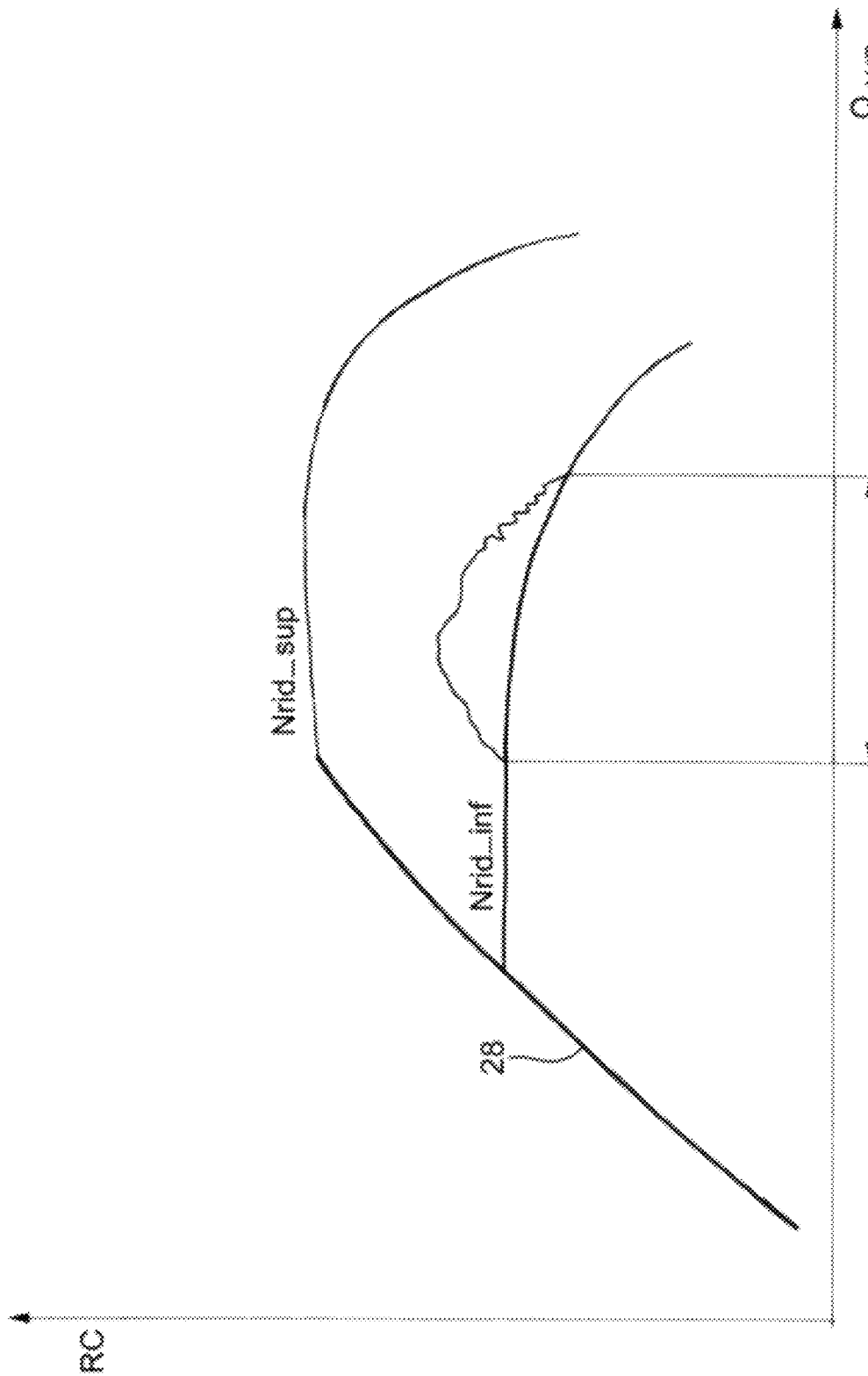

In particular, in a first step of setting and tuning, a first threshold value $S_{OV\_1}$ is determined and the turbocharger 12 is controlled to return the reduced limit speed to a value lower than the lower reduced limit speed $N_{rid\_inf}$ once an interval of time substantially equal to the first threshold value $S_{OV\_1}$ elapses from the instant in which the value of the current reduced limit speed is detected within the overspeed range (according to that illustrated in FIG. 6). In other words, when the electronic-control unit 21 detects a reduced current limit speed included in the overspeed range, a timer is started to return the reduced limit speed to a value lower than the lower reduced limit speed $N_{rid\_inf}$ once an interval of time substantially equal to the first threshold value $S_{OV\_1}$ has elapsed (for example, in a gradual manner).

According to an embodiment, a second threshold value $S_{OV\_2}$ is established in a preliminary step of setting and tuning. The electronic-control unit 21 is set up to initialize a timer whenever the reduced limit speed returns under the lower reduced limit speed $N_{rid\_inf}$ and inhibits the operation of the turbocharger 12 in the overspeed zone for a time range substantially equal to the second threshold value $S_{OV\_2}$.

The first threshold value $S_{OV\_1}$ and the second threshold value $S_{OV\_2}$ are variable as a function of a plurality of parameters that are indicative of the age and state of wear and stress of the turbocharger 12.

According to an embodiment, the control unit 21 is adapted to store the total time elapsed within the overspeed zone and to inhibit the operation of the turbocharger 12 within the overspeed zone for the remaining useful life of the turbocharger 12 itself once the total time is substantially equal to a safety limit value (established by a preliminary step of setting and tuning).

Furthermore, according to an embodiment, the control unit 21 is adapted to inhibit the operation of the turbocharger 12 within the overspeed zone when the reduced-mass-flow rate $Q_{AHR}$ is higher than the critical threshold $M_{critica}$.

According to an embodiment, threshold $S_{OV\_2}$ is variable as a function of the frequency of the most recent overspeeds. In other words, threshold $S_{OV\_2}$ is higher the more frequently a current reduced limit speed within the overspeed range is detected. The threshold $S_{OV\_2}$ may be calculated as follows for example:

$$S_{OV\_2} = f((\Sigma t_{over\_speed} - S_{OV\_3})/timer)$$

wherein $S_{OV\_3}$ is a decreasing operator (e.g., K*timer with K representing a predetermined coefficient), while the sum of the time elapsed within the overspeed range and the timer are initialized at each trip of the supercharged internal-combustion engine 1 (i.e., typically for each on/off cycle of the supercharged internal-combustion engine 1 and the timer is calculated from the first overspeed. The function is, for example, increasing.

According to a further variant, for each trip of the supercharged internal-combustion engine 1 (i.e., for each on/off cycle of the supercharged internal-combustion engine 1 itself). According to another embodiment, a counter C of the time elapsed in overspeed is started as soon as the control unit 21 verifies the operating condition within the overspeed zone. The counter C may be calculated by the following formula:

$$C = k1 * \Sigma t_{over\_speed} - k2 * \Sigma t_{NOT\_over\_speed}$$

wherein K1 and K2 are predetermined coefficients in a preliminary phase, while the sum of the time elapsed within the overspeed range and the sum elapsed outside of the overspeed zone are initialized at each trip of the supercharged internal-combustion engine 1.

According to an embodiment, a fourth threshold value $S_{OV\_4}$, which is compared with the counter C of the time elapsed in overspeed, is established during preliminary steps of setting and tuning. The control unit 21 is adapted to inhibit the operation of the turbocharger 12 within the overspeed zone if counter C higher than or substantially equal to the fourth threshold value $S_{OV\_4}$. On the contrary, if the counter C is lower than the fourth threshold value $S_{OV\_4}$, the control unit 21 is set up to allow the operation of the turbocharger 12 within the overspeed zone (for example, with the intervention of a hysteresis operator).

According to an embodiment, the control unit 21 uses the current pressure value of the turbocharger 12 instead of the current reduced limit speed to recognize the operation within the overspeed zone.

The control method is easy and cost-effective to implement. Also, the control method does not use a high calculating power of the electronic-control unit 21. Furthermore, the control method does not require the installation of additional electronic components (specifically sensors or actuators) with respect to those already present in a modern internal-combustion engine. In addition, the control method is particularly effective in ensuring that the operating field of the turbocharger 12 remains within the useful zone substantially close to the "saturation" line under any operating condition of the internal-combustion engine without ever reaching sonic blockage.

It should be appreciated by those having ordinary skill in the related art that the control method has been described above in an illustrative manner. It should be so appreciated also that the terminology that has been used above is intended to be in the nature of words of description rather than of limitation. It should be so appreciated also that many modifications and variations of the control method are possible in light of the above teachings. It should be so appreciated also that, within the scope of the appended claims, the control method may be practiced other than as specifically described above.

What is claimed is:

1. A method for controlling an internal-combustion engine (1) supercharged by a turbocharger (12) and including a turbine (13) and compressor (14), said control method comprising steps of:
   determining a pressure objective downstream of the compressor (14);
   determining a critical threshold ($M_{critica}$) of a reduced-mass-flow rate ($Q_{AHR}$) that delimits on a "reduced-mass-flow rate/compression ratio" plane a critical area substantially close to achievement of sonic conditions; and
   filtering by a first filter the pressure objective downstream of the compressor (14) when a current reduced-mass-flow rate ($Q_{AHR}$) is higher than the critical threshold.

2. A control method as set forth in claim 1, wherein said control method comprises further steps of:
   determining the current reduced-mass-flow rate ($Q_{AHR}$) of the compressor (14); and
   filtering by a second filter the current reduced-mass-flow rate ($Q_{AHR}$) when the current reduced-mass-flow rate ($Q_{AHR}$) is higher than the critical threshold ($M_{critica}$).

3. A control method as set forth in claim 1, wherein at least one of the first filter is a low-pass filter of the first order and the second filter is a low-pass filter of the first order.

4. A control method as set forth in claim 1, wherein said control method comprises further steps of:
   determining a safety threshold ($M_{max\_turbo}$) of the reduced-mass-flow rate ($Q_{AHR}$) that is higher than the critical threshold ($M_{critica}$);
   delimiting on a "reduced-mass-flow rate/compression ratio" plane a portion of the critical area substantially closest to the achievement of the sonic conditions; and
   imposing that the reduced-mass-flow rate ($Q_{AHR}$) of the compressor (14) has to be lower than the safety threshold ($M_{max\_turbo}$) of the reduced-mass-flow rate ($Q_{AHR}$).

5. A control method as set forth in claim 4, wherein said control method comprises further steps of:
   determining a safety threshold ($N_{max\_turbo}$) of speed of the internal-combustion engine (1) according to the safety threshold ($M_{max\_turbo}$) of the reduced-mass-flow rate ($Q_{AHR}$); and
   imposing that the speed of the internal-combustion engine (1) has to be lower than the safety threshold ($N_{max\_turbo}$) of the speed.

6. A control method as set forth in claim 5, wherein the safety threshold ($N_{max\_turbo}$) of the speed of the internal-combustion engine (1) is calculated by the following equation:

$$N_{max\_turbo} = M_{max\_turbo} \cdot \sqrt{T_{o\_rif}/T_o} \cdot P_o/P_{o\_rif} \cdot 1/(m \cdot 30 \cdot N_{cil})$$

wherein
   $N_{max\_turbo}$=the safety threshold of the speed of the supercharged internal-combustion engine (1);
   $M_{max\_turbo}$=the safety threshold of the reduced-mass-flow rate ($Q_{AHR}$);
   $T_o$=absolute temperature upstream of the compressor (14);
   $P_o$=absolute pressure upstream of the compressor (14);
   $T_{o\_rif}$=absolute reference temperature;
   $P_{o\_rif}$=absolute reference pressure;
   $N_{cil}$=number of cylinders (3) of the internal-combustion engine (1); and
   M=air mass taken in by each cylinder (3) of the internal-combustion engine (1).

7. A control method as set forth in claim 1, wherein said control method comprises further steps of:
   establishing a predetermined limit speed (N) of the compressor (14);
   calculating a reduced limit speed ($N_R$) of the compressor (14) by using the predetermined limit speed (N) of the compressor (14) and an absolute temperature ($T_o$) upstream of the compressor (14); and
   determining at least one of the critical threshold ($M_{critica}$) of the reduced-mass-flow rate ($Q_{AHR}$) and a safety threshold ($M_{max\_turbo}$) of the reduced-mass-flow rate ($Q_{AHR}$) according to the reduced limit speed ($N_R$).

8. A control method as set forth in claim 1, wherein said control method comprises further steps of:
   establishing on the "reduced-mass-flow rate/compression ratio" plane at least one limit curve (29, 30) of operation of the compressor (14);
   determining a supercharging-limit value by using the limit curve (29, 30) according to the current reduced-mass-flow rate ($Q_{AHR}$); and
   determining the pressure objective downstream of the compressor (14) according to the supercharging-limit value and the pressure objective downstream of the compressor (14) obtained by an engine control.

9. A control method as set forth in claim 8, wherein said control method comprises further steps of:
   determining a current limit-compression ratio (RC) of the compressor (14) according to the current reduced-mass-flow rate ($Q_{AHR}$) and limit curve (29, 30);
   detecting a current pressure value upstream of the compressor (14);
   determining the supercharging-limit value downstream of the compressor (14) by multiplying the current pressure value upstream of the compressor (14) by the current limit-compression ratio (RC);
   determining, regardless of the supercharging-limit value and according to an engine point, an objective-pressure value downstream of the compressor (14); and
   limiting the pressure objective downstream of the compressor (14) to the supercharging-limit value in case the objective-pressure value downstream of the compressor (14) obtained by the engine control is higher than the supercharging-limit value.

* * * * *